United States Patent
Kurosaki et al.

(10) Patent No.: US 9,517,735 B2
(45) Date of Patent: Dec. 13, 2016

(54) INTERIOR MATERIAL

(71) Applicant: TS TECH CO., LTD., Asaka-Shi, Saitama (JP)

(72) Inventors: Hideyuki Kurosaki, Ohtawara (JP); Kenichi Arai, Haga-Gun (JP)

(73) Assignee: TS Tech Co., Ltd., Saitama (JP)

( * ) Notice: Subject to any disclaimer, the term of this patent is extended or adjusted under 35 U.S.C. 154(b) by 15 days.

(21) Appl. No.: 14/383,276

(22) PCT Filed: Feb. 8, 2013

(86) PCT No.: PCT/JP2013/052996
§ 371 (c)(1),
(2) Date: Sep. 5, 2014

(87) PCT Pub. No.: WO2013/132952
PCT Pub. Date: Sep. 12, 2013

(65) Prior Publication Data
US 2015/0048647 A1   Feb. 19, 2015

(30) Foreign Application Priority Data
Mar. 8, 2012   (JP) ................. 2012-051995

(51) Int. Cl.
*B60R 13/02*   (2006.01)

(52) U.S. Cl.
CPC ........... *B60R 13/0243* (2013.01); *B60R 13/02* (2013.01)

(58) Field of Classification Search
CPC ............................ B60R 13/02; B60R 13/0243
USPC ....................................................... 296/146.7
See application file for complete search history.

(56) References Cited

U.S. PATENT DOCUMENTS

| 2009/0090285 A1* | 4/2009 | Dooley ................... B29C 45/14 |
| | | 112/470.27 |
| 2013/0153122 A1* | 6/2013 | Filipp .................. B60N 2/5883 |
| | | 156/93 |

FOREIGN PATENT DOCUMENTS

| JP | 60-158498 A | 10/1985 |
| JP | 60-158498 U | 10/1985 |
| JP | 11-321315 A | 11/1999 |
| JP | 2011-046311 A | 3/2011 |

* cited by examiner

*Primary Examiner* — Glenn Dayoan
*Assistant Examiner* — Melissa A Black
(74) *Attorney, Agent, or Firm* — Carrier Blackman & Associates, P.C.; William D. Blackman; Jingli Wang

(57) ABSTRACT

A door lining serving as an interior material comprises a door center portion. The door center portion is provided with: a door center base material; a door center pad supported by the door center base material and configured to be elastically deformable; a door center surface skin material covering the door center pad; and a sewed portion formed by sewing the door center pad and the door center surface skin material together by a sewing thread. In the door center pad, a thick section and a thin section are formed, and the sewed portion is provided in the thin section.

11 Claims, 18 Drawing Sheets

INTERIOR MATERIAL

TECHNICAL FIELD

The present invention relates to an interior member (interior material) having a sewn region that is produced by sewing together an elastically deformable pad and a skin member covering the pad.

BACKGROUND ART

Heretofore, door linings for vehicles have widely been known as interior members. In connection with such door linings, there has been disclosed a technical idea of covering a pad in the form of a belt-like polyurethane foam with a skin member and sewing the sides of the pad and the skin member to each other (see, for example, Japanese Laid-Open Patent Publication No. 11-321315).

When the sides of the pad and the skin member are stitched together, since the sides of the pad are pressed and compressively deformed by the sewing thread, the sides of the pad are made thinner than the central region of the pad even though the thickness of the pad is uniform before it is sewn (see, for example, FIG. 2 of Japanese Laid-Open Patent Publication No. 11-321315).

SUMMARY OF INVENTION

According to the background art disclosed in Japanese Laid-Open Patent Publication No. 11-321315, as the thickness of the pad is uniform (the sides of the pad are thick) before it is sewn, reaction force (elastic force) that is applied from the pad to the sewing thread are comparatively large. Consequently, the durability of the sewing thread tends to be lowered.

In this case, sewing holes formed in the pad when the sewing needle passes through the pad to sew the pad and the skin member together are widened along the direction in which the sewing thread extends. Therefore, successive portions, which may be referred to as unit stitches, of the sewing thread that are exposed on the outer surface of the skin member are liable to sink into the sewing holes to a large extent, thereby making it difficult for the seam to be visually recognized.

The present invention has been made in view of the above problems. It is an object of the present invention to provide an interior member which is capable of increasing the durability of a sewing thread used to sew a pad and a skin member to each other, by reducing reaction force that is applied from the pad to the sewing thread, and which makes the seam easy to visually recognize.

According to the present invention, there is provided an interior member including a pad including a thin-walled portion and a thick-walled portion, the pad being elastically deformable, a skin member that covers the pad, and a sewn region produced by sewing the pad and the skin member to each other with a sewing thread, wherein the sewn region is disposed on the thin-walled portion of the pad (first feature).

The thin-walled portion should preferably be formed by bending (second feature).

The interior member should preferably further include a base that supports the pad thereon, wherein the base should preferably include a ledge configured to push a portion of the sewn region that is positioned on a side of the pad, toward the skin member of the sewn region (third feature).

The ledge should preferably have a corner, and the sewing thread should preferably be held in contact with a portion of the ledge that is different from the corner (fourth feature).

The ledge should preferably be of an arc-like cross-sectional shape (fifth feature).

The base should preferably further include a flat portion contiguous to the ledge, and the thick-walled portion should preferably be disposed on the flat portion, and the thin-walled portion should preferably be disposed on the ledge (sixth feature).

An area of the thin-walled portion that corresponds to the sewn region should preferably be thinner than an area of the thin-walled portion that does not correspond to the sewn region (seventh feature).

The sewn region should preferably include a thin-walled sewn region produced by sewing the skin member and the thin-walled portion to each other with the sewing thread, and a thick-walled sewn region produced by sewing the skin member and the thick-walled portion to each other with the sewing thread, the thin-walled sewn region and the thick-walled sewn region being integral with each other (eighth feature).

The thin-walled portion should preferably be wider than the diameter of the sewing thread (ninth feature).

The interior member should preferably be mounted on a vehicle (tenth feature).

The thin-walled portion should preferably be made of polypropylene foam (eleventh feature).

The sewing thread may be positioned on the crest of the ledge (twelfth feature).

According to the first feature of the invention, since the sewn region is disposed on the thin-walled portion of the pad, the reaction force applied from the pad to the sewing thread is smaller than, for example, in a case where the sewn region is disposed on the thick-walled portion of the pad. Therefore, the durability of the sewing thread can be increased. As sewing holes are prevented from being widened along the direction in which the sewing thread extends, the extent to which each unit stitch sinks into the sewing hole can be reduced. The seam of the sewn region can thus be made easier to visually recognize.

According to the second feature of the invention, since the thin-walled portion is formed by bending, the thin-walled portion can be increased in rigidity.

According to the third feature of the invention, inasmuch as the base includes a ledge configured to push a portion of the sewn region that is positioned on a side of the pad, toward the skin member of the sewn region, the extent to which each unit stitch sinks into the sewing hole can be further reduced. The seam of the sewn region can thus be made much easier to visually recognize.

According to the fourth feature of the invention, since the sewing thread is held in contact with a portion of the ledge that is different from the corner, the sewing thread can be prevented from being damaged by the corner.

According to the fifth feature of the invention, since the ledge is of an arc-like cross-sectional shape, the sewing thread can be efficiently pushed toward the outer surface of the skin member.

According to the sixth feature of the invention, as the thick-walled portion is disposed on the flat portion of the base, and the thin-walled portion is disposed on the ledge, a reduction in the rigidity of the pad due to the thinning of the pad can be efficiently minimized.

According to the seventh feature of the invention, an area of the thin-walled portion that corresponds to the sewn region is thinner than an area of the thin-walled portion that does not correspond to the sewn region, the thickness of the thin-walled portion can be reduced stepwise or continuously. A reduction in the rigidity of the thin-walled portion can thus be efficiently minimized.

According to the eighth feature of the invention, the sewn region is produced by making the thin-walled sewn region and the thick-walled sewn region integral with each other. Therefore, the seam of the sewn region can contain variations.

According to the ninth feature of the invention, since the thin-walled portion is wider than the diameter of the sewing thread, the sewing thread can easily be disposed on the thin-walled portion when the pad and the skin member are sewn together.

According to the tenth feature of the invention, the interior member can be used as an interior member on a vehicle.

According to the eleventh feature of the invention, since the thin-walled portion is made of polypropylene foam, the reaction force that attempts to restore the thin-walled portion to its original shape when being deformed can be made comparatively small. Accordingly, the reaction force applied from the pad to the sewing thread can be further reduced.

According to the twelfth feature of the invention, inasmuch as the sewing thread is positioned on the crest of the ledge, the sewing thread can be further efficiently pushed toward the outer surface of the skin member.

DESCRIPTION OF EMBODIMENTS

Interior members according to preferred embodiments of the present invention in relation to door members incorporating such interior members will be described in detail below.

Figure 1:
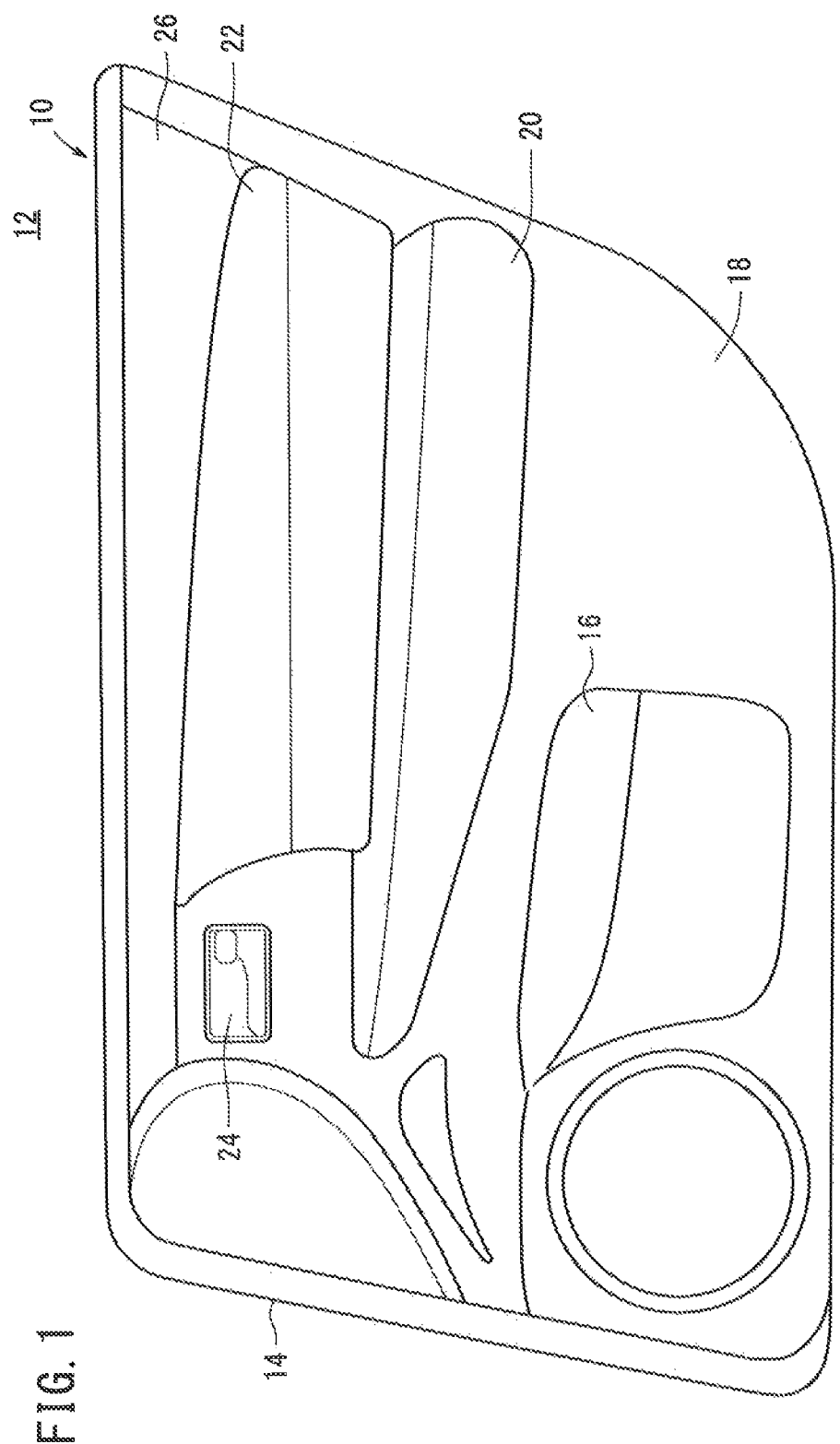
FIG. 1 is a perspective view of a door member which incorporates a door lining as an interior member according to an embodiment of the present invention.

As shown in FIG. 1, a door member 12 according to an embodiment of the present invention makes up part of a front right door of an automobile, and has a main door body 14 to which a window frame, not shown, is to be connected, and a door lining 10 as an interior member mounted on the main door body 14. The main door body 14 is made of a metal material such as steel sheet or the like.

The door lining 10 includes a lower door section 18 which makes up a lower portion of the door lining 10 and has a door pocket 16, an arm rest 20 disposed above the lower door section 18, a central door section 22 which makes up an intermediate portion of the door lining 10, a door knob 24 disposed between the arm rest 20 and the central door section 22, and an upper door section 26 which makes up an upper portion of the door lining 10.

Figure 2:
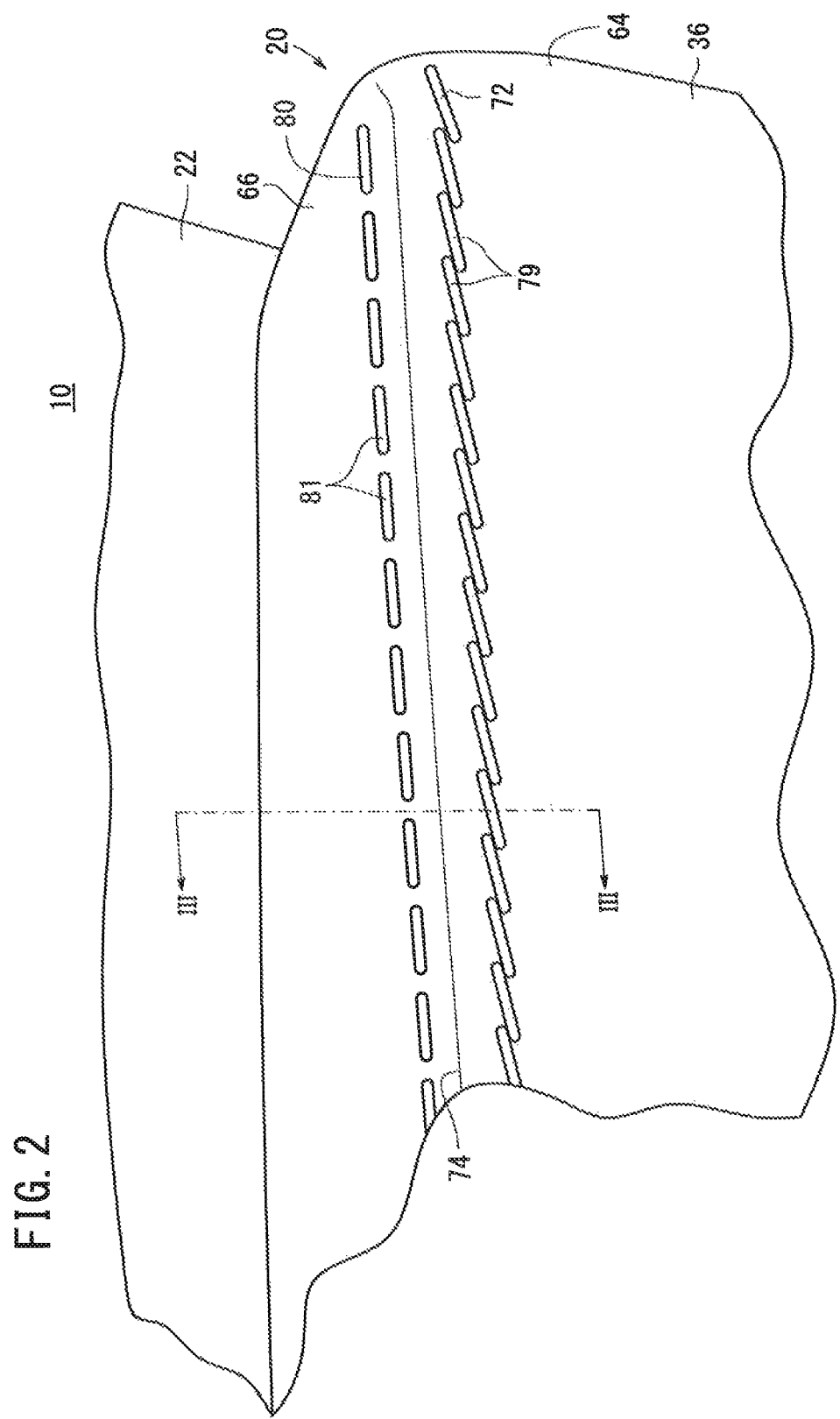
FIG. 2 is an enlarged fragmentary perspective view of a door arm shown in FIG. 1.
Figure 3:
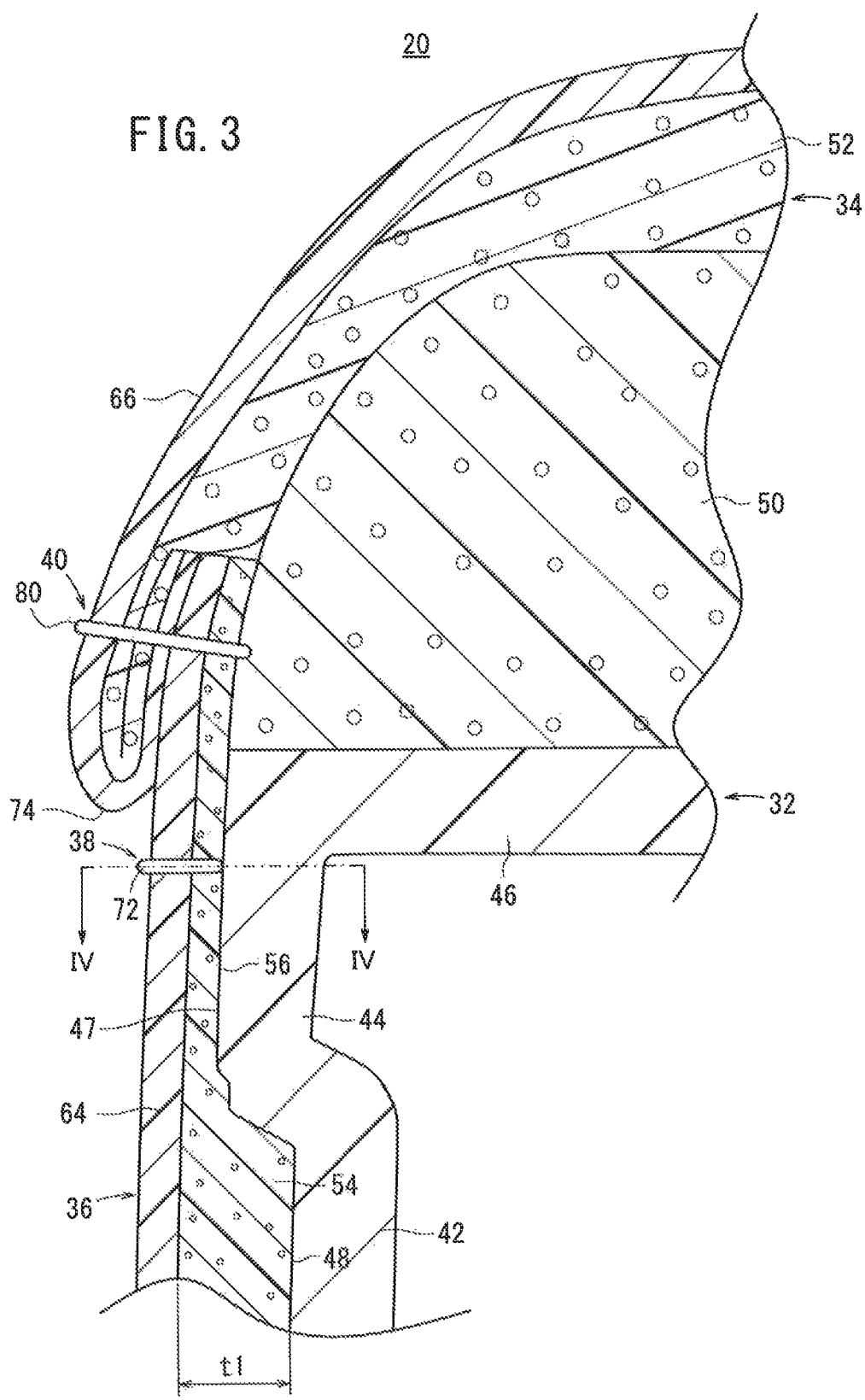
FIG. 3 is a cross-sectional view taken along line III-III of FIG. 2.
Figure 4:
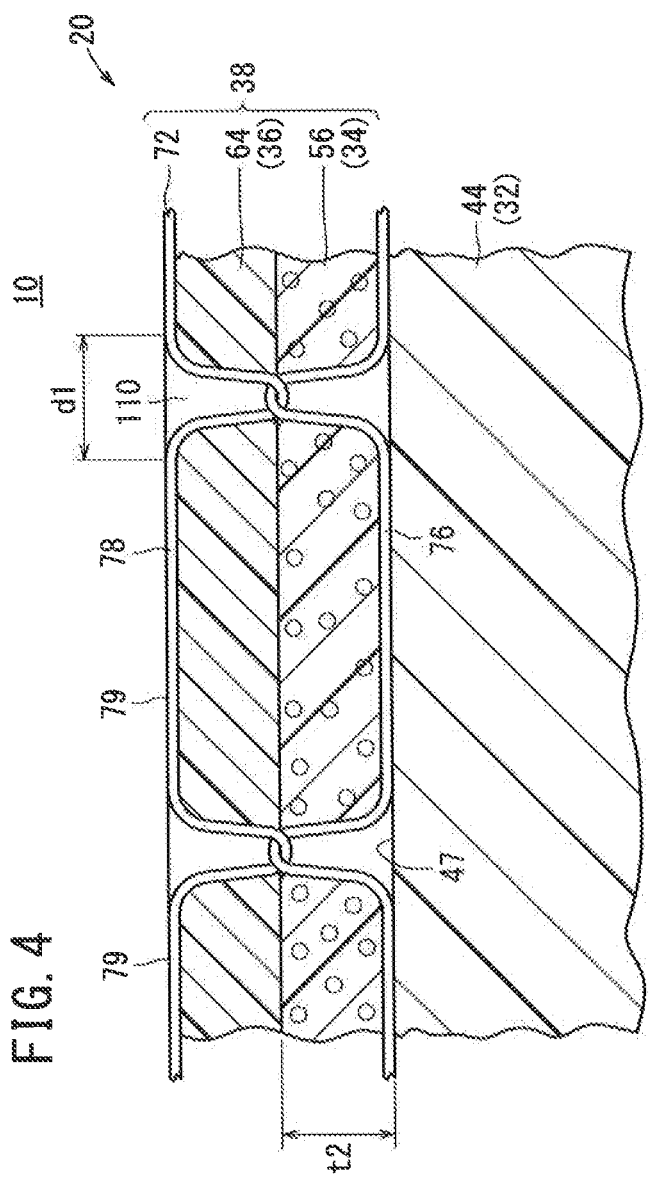
FIG. 4 is a cross-sectional view taken along line IV-IV of FIG. 3.

As shown in FIGS. 2 through 4, the arm rest 20 has an arm rest base 32 mounted on the main door body 14, an arm rest pad 34 disposed as a cushioning member on the arm rest base 32, an arm rest skin member 36 covering the arm rest pad 34, and a first sewn region 38 and a second sewn region 40 that are produced by sewing the arm rest pad 34 and the arm rest skin member 36 together.

The arm rest base 32, which serves as a framework of the arm rest 20, is made of a resin material such as polypropylene (PP), ABS resin, or the like. The arm rest base 32 includes a base side surface (flat portion) 42 that forms a side surface of the arm rest 20, a ledge 44 contiguous to the base side surface 42 and projecting toward one side (to the left in FIG. 3, into the passenger compartment), and a base upper surface 46 extending from the ledge 44 toward the opposite side (to the right in FIG. 3, away from the passenger compartment) and which forms an upper surface of the arm rest 20. The ledge 44 has a distal end surface 47 shaped as a flat surface.

The arm rest pad 34 is made of a resin material such as polypropylene foam (PPF) or the like which generates small reaction force, for example, and has an adequate level of softness. In other words, the arm rest pad 34 is elastically deformable.

The arm rest pad 34 has a side surface pad 48 that forms the side surface of the arm rest 20, and an upper surface inner pad 50 and an upper surface outer pad 52 that form the upper surface of the arm rest 20.

The side surface pad 48 includes a thick-walled portion 54 disposed on the base side surface 42 and a thin-walled portion 56 contiguous to the thick-walled portion 54 and disposed on the ledge 44.

The thin-walled portion 56 has a thickness t2 (see FIG. 4) which may be set to any value within a range smaller than the thickness t1 (see FIG. 3) of the thick-walled portion 54. For example, the thickness t2 should preferably be 2 mm or smaller. The thickness t2 thus selected is effective to reduce, to an appropriate level, the reaction force (elastic force)

applied from the thin-walled portion 56 to a first sewing thread 72 (second sewing thread 80) to be described later.

The upper surface inner pad 50 is relatively thick and disposed on the base upper surface 46. The upper surface outer pad 52 is disposed so as to cover the upper surface inner pad 50 from above.

The arm rest skin member 36 is made of polyvinyl chloride (PVC), non-polyvinyl chloride (TPO), or the like, for example. The arm rest skin member 36 has a side surface skin 64 that forms the side surface of the arm rest 20 and an upper surface skin 66 that forms the upper surface of the arm rest 20. The side surface skin 64 is disposed in covering relation to the side surface pad 48, whereas the upper surface skin 66 is disposed in covering relation to a portion of the side surface skin 64 and the upper surface outer pad 52.

The first sewn region 38 is produced by sewing the thin-walled portion 56 and the side surface skin 64 to each other with the first sewing thread 72 on a sewing machine or the like. The first sewn region 38 extends along a boundary line 74 between the side surface skin 64 and the upper surface skin 66.

As can be understood from FIG. 3, the thin-walled portion 56 is wider than the diameter of the first sewing thread 72. Consequently, when the thin-walled portion 56 and the side surface skin 64 are sewn to each other, the first sewing thread 72 can easily be placed in the thin-walled portion 56.

The first sewing thread 72 comprises a lower thread 76 and an upper thread 78. The upper thread 78 has portions which are exposed on the outer surface (facing the passenger compartment) of the arm rest 20 so as to form a seam (machine-sewn seam).

According to the present embodiment, the seam of the first sewn region 38 is represented by successive portions (unit stitches 79) of the upper thread 78 which are exposed on the outer surface of the arm rest 20, each of the successive portions extending obliquely at a certain angle to a direction along which the boundary line 74 (first sewn region 38) extends. The seam thus shaped can enhance the design property of the arm rest 20. The seam may also hereinafter be referred to as slanted stitches.

The lower thread 76 of the first sewing thread 72 is held in contact with the distal end surface 47 of the ledge 44. In other words, the first sewing thread 72 is pushed out to one side by the distal end surface 47 of the ledge 44. Since the lower thread 76 of the first sewing thread 72 is held in contact with the distal end surface (flat surface) 47 of the ledge 44, not the corners thereof, the first sewing thread 72 is prevented from being damaged by the corners of the ledge 44.

The second sewn region 40 is produced by sewing the thin-walled portion 56, the side surface skin 64, the upper surface outer pad 52, and the upper surface skin 66 with the second sewing thread 80 on a sewing machine or the like. The second sewn region 40 extends along the boundary line 74. As can be seen from FIG. 2, the seam of the second sewn region 40 is represented by unit stitches 81 which extend along the direction along which the boundary line 74 (second sewn region 40) extends.

Figure 5:
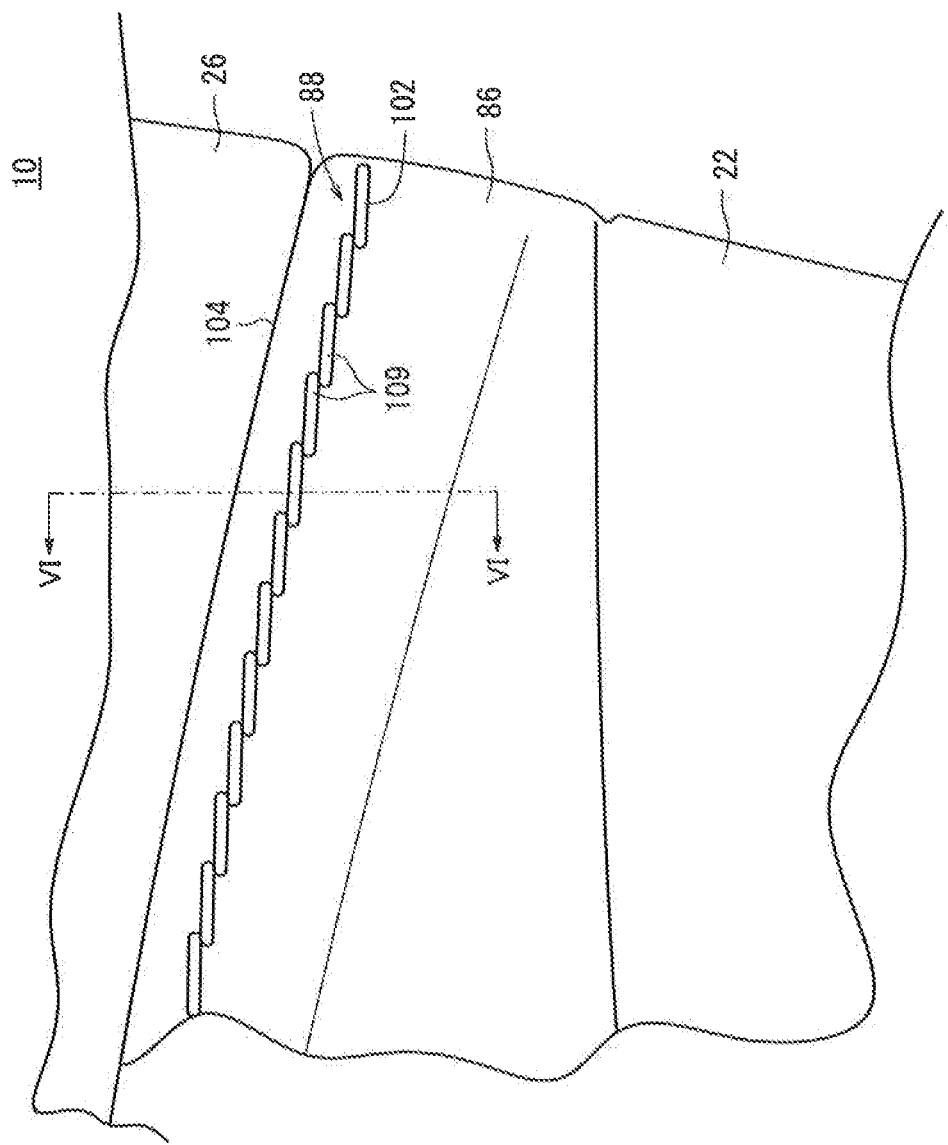
FIG. 5 is an enlarged fragmentary perspective view of a central door section shown in FIG. 1.
Figure 6:
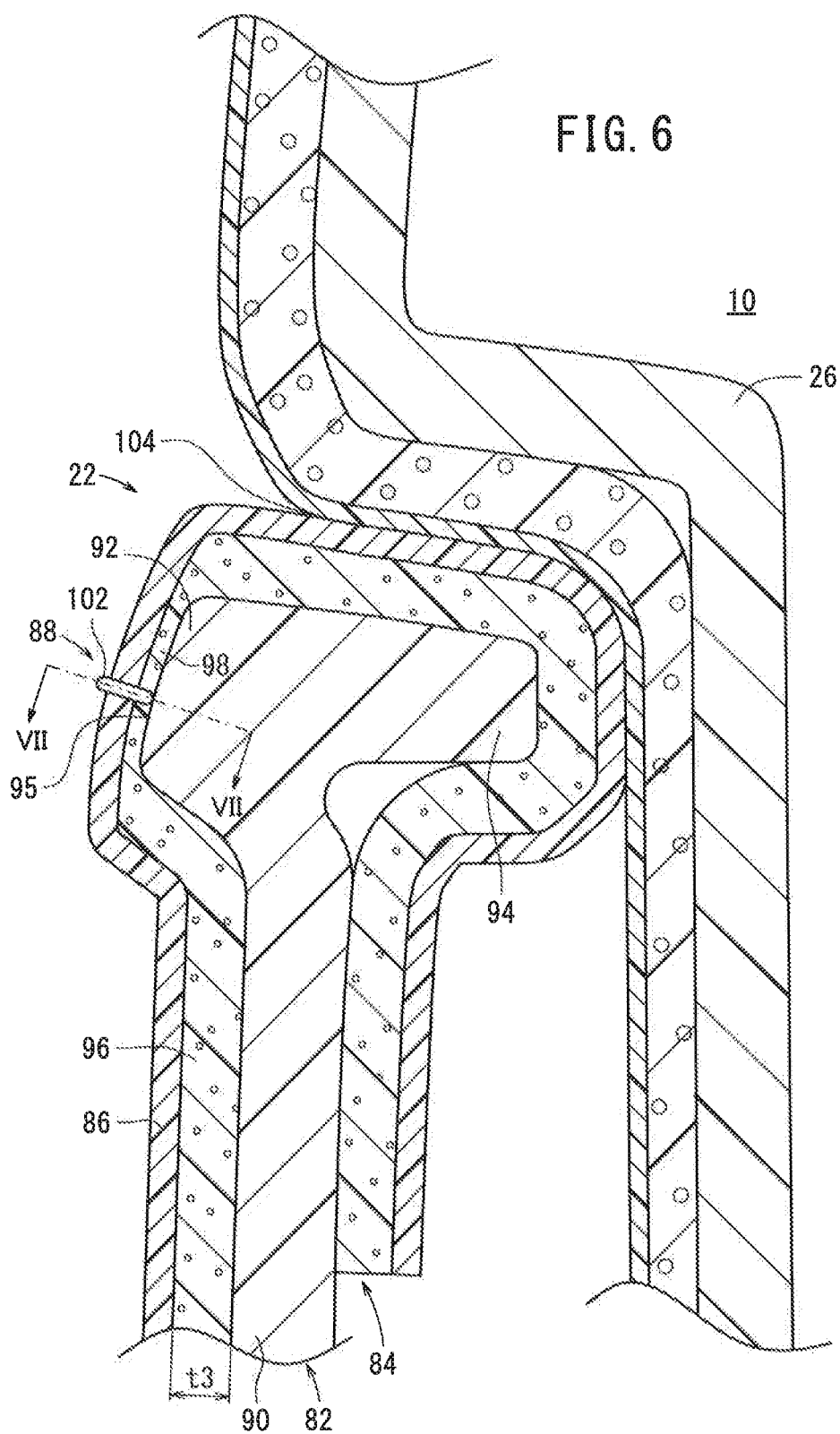
FIG. 6 is a cross-sectional view taken along line VI-VI of FIG. 5.
Figure 7:
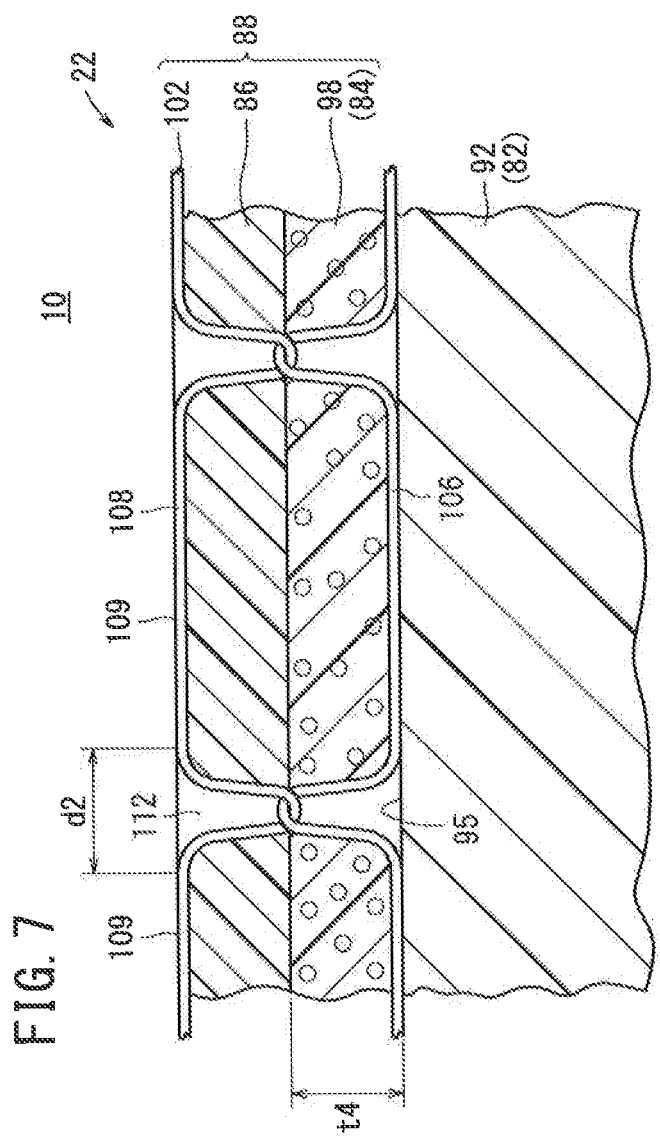
FIG. 7 is a cross-sectional view taken along line VII-VII of FIG. 6.

As shown in FIGS. 5 through 7, the central door section 22 has a central door base 82 mounted on the main door body 14, a central door pad 84 disposed as a cushioning member on the central door base 82, a central door skin member 86 covering the central door pad 84, and a third sewn region 88 that is produced by sewing the central door pad 84 and the central door skin member 86 together.

The central door base 82, which serves as a framework of the central door section 22, may be made of the same material as the arm rest base 32 described above. The central door base 82 includes a plate-like main base (flat portion) 90, which is of a shape corresponding to the shape of the central door section 22, a first ledge 92 projecting from an edge (upper end) of the main base 90 to one side (the left in FIG. 6, inwardly of the passenger compartment), and a second ledge 94 projecting from the edge of the main base 90 to the opposite side (the right in FIG. 6, outwardly of the passenger compartment). The first ledge 92 has a distal end surface 95 shaped as a flat surface.

The central door pad 84 may be made of the same material as the arm rest pad 34, and is elastically deformable. The central door pad 84 includes a thick-walled portion 96 disposed on the main base 90 and a thin-walled portion 98 contiguous to the thick-walled portion 96 and disposed on the first ledge 92. The thick-walled portion 96 covers one surface of the main base 90 substantially in its entirety, an outer surface of the second ledge 94, and an upper portion of the opposite surface of the main base 90.

The central door pad 84 is formed by being bent along the outer shape of the first ledge 92 and the outer shape of the second ledge 94. That is, since the thin-walled portion 98 is formed by bending, it is of higher rigidity than in a case where the thin-walled portion 98 is not formed by bending.

The thin-walled portion 98 has a thickness t4 (see FIG. 7) which may be set to any value within a range smaller than the thickness t3 (see FIG. 6) of the thick-walled portion 96. For example, the thickness t4 should preferably be 2 mm or smaller. The thickness t4 thus selected is effective to reduce, to an appropriate level, the reaction force (elastic force) applied from the thin-walled portion 98 to a third sewing thread 102 to be described later.

The central door skin member 86 may be made of the same material as the arm rest skin member 36, and is disposed in covering relation to the outer surface of the central door pad 84 substantially in its entirety.

The third sewn region 88 is produced by sewing the thin-walled portion 98 and the central door skin member 86 to each other with the third sewing thread 102 on a sewing machine or the like. The third sewn region 88 extends along a boundary line 104 between the central door section 22 and the upper door section 26 (see FIG. 5).

As can be understood from FIG. 6, the thin-walled portion 98 is wider than the diameter of the third sewing thread 102. Consequently, when the thin-walled portion 98 and the central door skin member 86 are sewn to each other, the third sewing thread 102 can easily be placed in the thin-walled portion 98.

The third sewing thread 102 comprises a lower thread 106 and an upper thread 108. The upper thread 108 has portions which are exposed on the outer surface (facing the passenger compartment) of the central door skin member 86 so as to form a seam (machine-sewn seam).

According to the present embodiment, the seam of the third sewn region 88 is represented by successive portions (unit stitches 109) of the upper thread 108 which are exposed on the outer surface of the central door skin member 86, each of the successive portions extending obliquely to a direction along which the boundary line 104 (third sewn region 88) extends. The seam thus shaped of the third sewn region 88 represents slanted stitches, which can enhance the design property of the central door section 22.

The lower thread 106 of the third sewing thread 102 is held in contact with the distal end surface 95 of the first ledge 92. In other words, the third sewing thread 102 is pushed out to one side by the distal end surface 95 of the first ledge 92. Since the lower thread 106 of the third sewing thread 102 is held in contact with the distal end surface (flat surface) 95 of the first ledge 92, not the corners thereof, the third sewing thread 102 is prevented from being damaged by the corners of the first ledge 92.

The door lining 10 according to the present embodiment is basically constructed as described above. Advantages of the door lining 10 will be described below in comparison with a door lining 400 according to a comparative example.

First, the door lining 400 according to the comparative example will be described below with reference to FIGS. 16 through 18.

Figure 16:
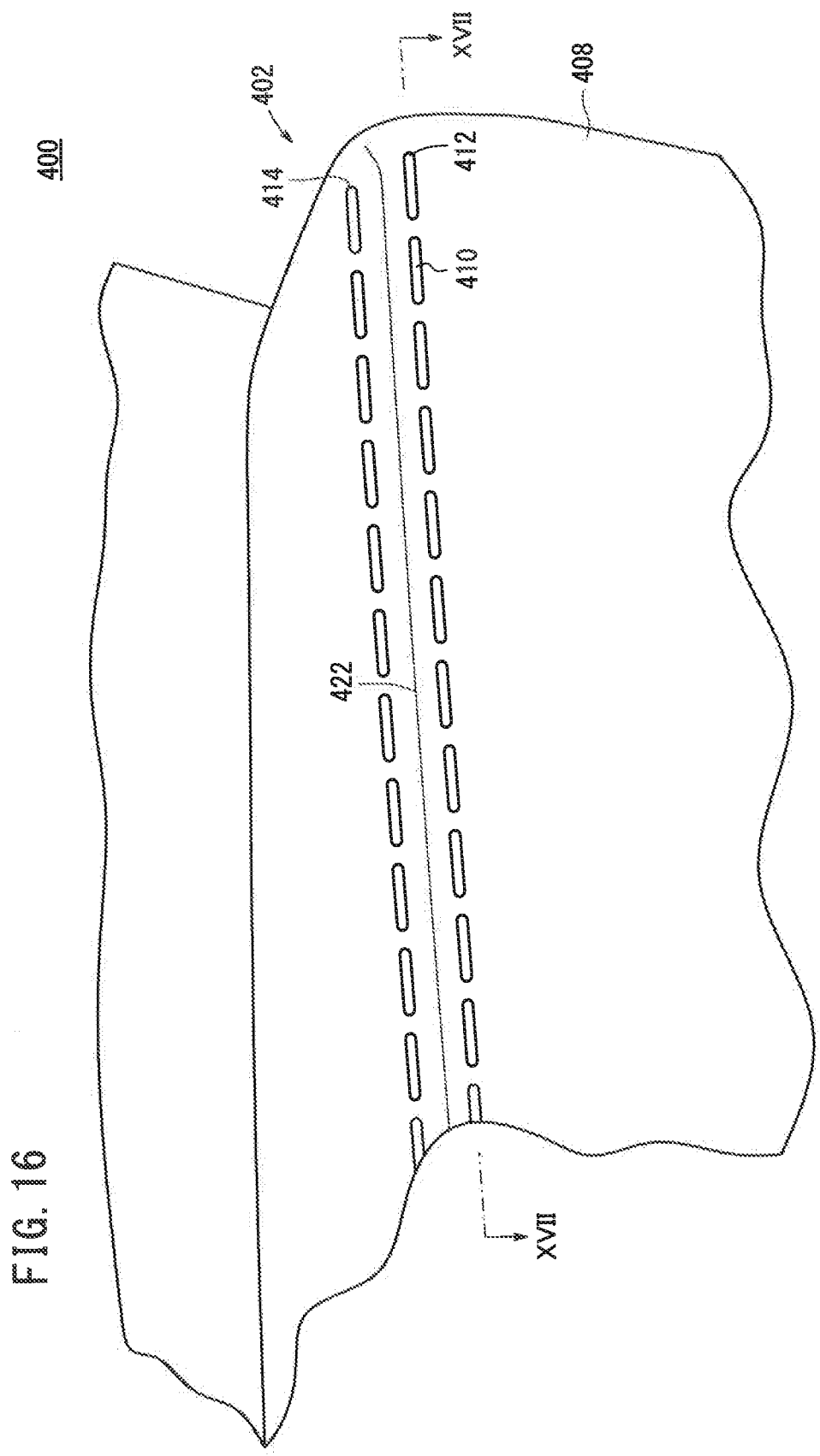
FIG. 16 is a fragmentary perspective view of an arm rest of a door lining as an interior member according to a comparative example.
Figure 17:
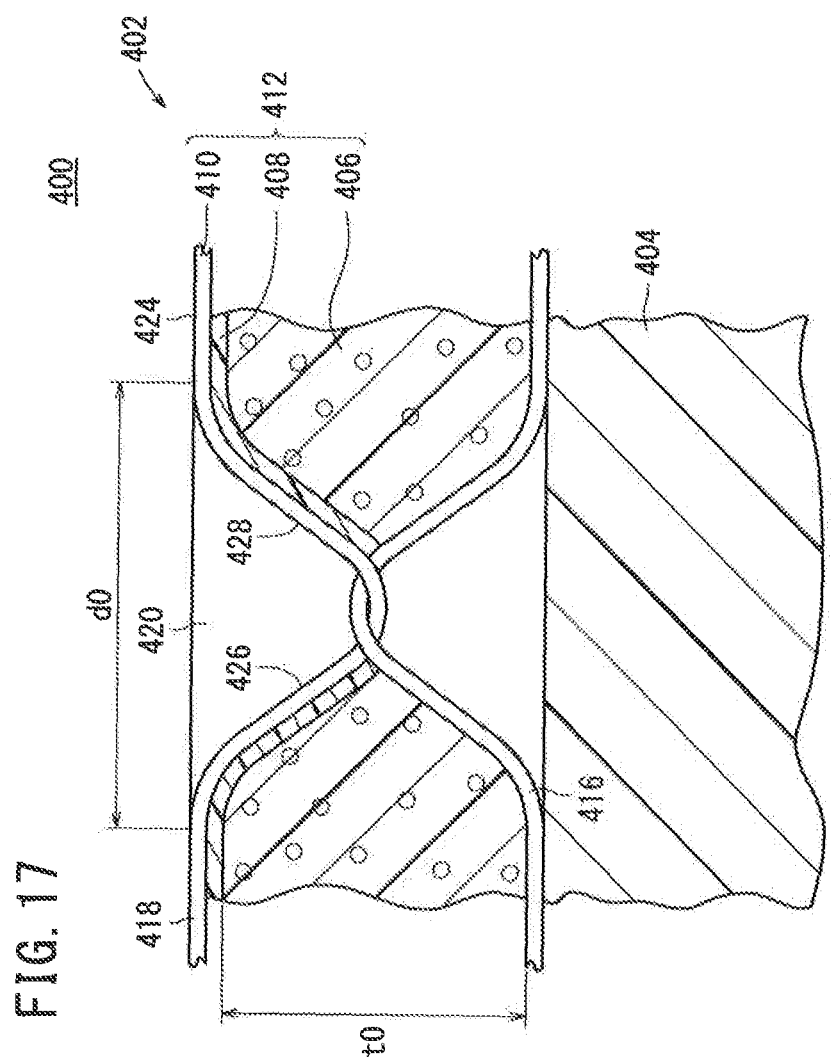
FIG. 17 is a cross-sectional view taken along line XVII-XVII of FIG. 16.

As shown in FIGS. 16 and 17, the door lining 400 has an arm rest 402 including an arm rest pad 406 disposed on an arm rest base 404 and having a uniform thickness t0 (e.g., the thickness t1 of the thick-walled portion 54 according to the present embodiment), and an arm rest skin member 408 that is sewn to the arm rest pad 406 by a sewing thread 410 so as to produce a sewn region 412. As can be seen from FIG. 16, the arm rest 402 also has a sewn region 414 which is identical in structure to the sewn region 412.

With the door lining 400 according to the comparative example, the arm rest pad 406 is thick, and the compressive deformation amount of the arm rest pad 406 is accordingly large. As the arm rest pad 406 is compressively deformed greatly, the reaction force (elastic force) applied from the arm rest pad 406 to a lower thread 416 and an upper thread 418 that make up the sewing thread 410 is increased, so that the durability of the sewing thread 410 tends to be lowered.

The door lining 400 has sewing holes 420 formed when the sewing needle passes through the arm rest skin member 408 and the arm rest pad 406 to sew the arm rest skin member 408 and the arm rest pad 406 to each other, the sewing holes 420 being widened along the direction in which the sewn region 412 extends. Stated otherwise, each of the sewing holes 420 has an opening defined in the arm rest skin member 408 and having a dimension (which may hereinafter be referred to as "opening width"), which is increased to d0 along the direction in which the sewn region 412 (boundary line 422) extends. Therefore, each of unit stitches 424 of the sewing thread 410 has ends 426, 428 that sink into the sewing hole 420 to a large extent.

Figure 18:
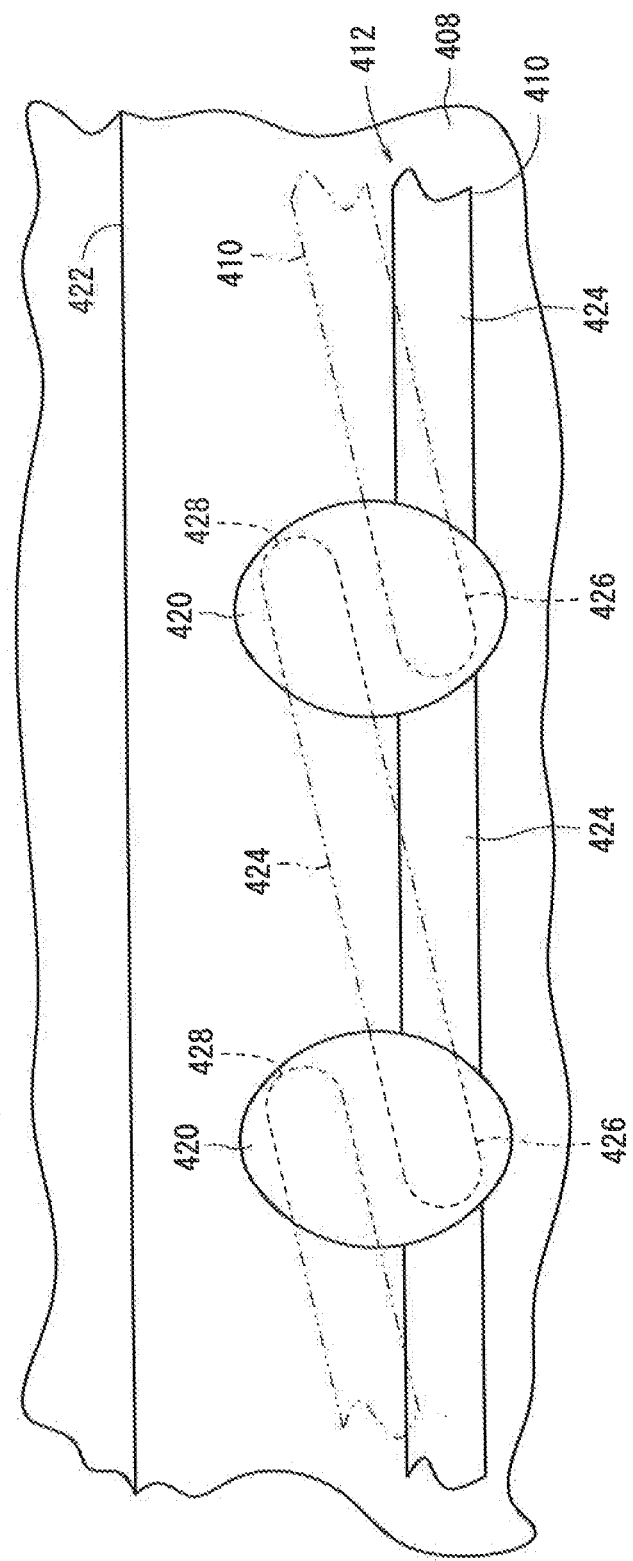
FIG. 18 is an explanatory diagram showing a seam of a first sewn region shown in FIG. 16.

Then, as shown in FIG. 18, even if sewing by the sewing thread 410 is performed such that the seam of the sewn region 412 is made up of slanted stitches, as indicated by the two-dot-and-dash lines in FIG. 18, the ends 426, 428 of the unit stitches 424 of the sewn region 412 are hardly visually recognizable, and the unit stitches 424 extend along the direction in which the sewn region 412 extends. In other words, in the seam of the sewn region 412, the extending direction of the unit stitches 424 is aligned with the extending direction of the sewn region 412. The seam thus shaped may hereinafter be referred to as straight stitches.

According to the present embodiment, since the first sewn region 38 is produced on the arm rest 20 by sewing the thin-walled portion 56 of the side surface pad 48 and the side surface skin 64 with the first sewing thread 72, the reaction force applied from the arm rest pad 34 to the first sewing thread 72 is smaller than, for example, in a case where the thickness t2 of the thin-walled portion 56 is set to the thickness t1 of the thick-walled portion 54. Therefore, the durability of the first sewing thread 72 can be increased.

Furthermore, as the first sewn region 38 is provided on the thin-walled portion 56, an opening width d1 (see FIG. 4) of each sewing hole 110 in the first sewn region 38 can be made smaller than the opening width d0 (see FIG. 17) of each sewing hole 420 of the door lining 400 according to the comparative example. The smaller opening width d1 is effective for reducing the extent to which each unit stitch 79 sinks into the sewing hole 110, so that the ends of each unit stitch 79 are easier to visually recognize, and the extending direction of each unit stitch 79 and the extending direction of the first sewn region 38 are not aligned with each other. Consequently, the seam of the first sewn region 38 can easily be visually recognized, and can be made up of slanted stitches (see FIG. 2).

According to the present embodiment, moreover, inasmuch as the ledge 44 of the arm rest base 32 pushes the thin-walled portion 56 of the first sewn region 38 toward the side surface skin 64, the extent to which each unit stitch 79 sinks into the sewing hole 110 is further reduced. The seam of the first sewn region 38 can thus be made easier to visually recognize.

The thick-walled portion 54 is disposed on the base side surface 42 serving as a flat portion of the arm rest base 32, whereas the thin-walled portion 56 is disposed on the ledge 44. Therefore, a reduction in the rigidity of the arm rest pad 34 due to the thinning thereof can be efficiently minimized.

Furthermore, as the thin-walled portion 56 (arm rest pad 34) is made of polypropylene foam, the reaction force that attempts to restore the thin-walled portion 56 to its original shape when being deformed can be made comparatively small. Accordingly, the reaction force applied from the arm rest pad 34 to the first sewing thread 72 can be further reduced.

According to the present embodiment, since the third sewn region 88 is produced on the central door section 22 by sewing the thin-walled portion 98 of the central door pad 84 and the central door skin member 86 with the third sewing thread 102, the reaction force applied from the central door pad 84 to the third sewing thread 102 can be smaller than in a case where the thickness t4 of the thin-walled portion 98 is identical to the thickness t3 of the thick-walled portion 96. Therefore, the durability of the third sewing thread 102 can be increased.

Furthermore, as the third sewn region 88 is provided on the thin-walled portion 98, an opening width d2 (see FIG. 7) of each sewing hole 112 in the third sewn region 88 can be made smaller than the opening width d0 (see FIG. 17) of each sewing hole 420 of the door lining 400 according to the comparative example. The smaller opening width d2 is effective for reducing the extent to which each unit stitch 109 sinks into the sewing hole 112, so that the ends of each unit stitch 109 of the third sewing thread 102 become easier to visually recognize and the direction along which each unit stitch 109 extends and the direction along which the third sewn region 88 extends are not aligned with each other. Consequently, the seam of the third sewn region 88 can easily be visually recognized, and can be formed of slanted stitches (see FIG. 5).

According to the present embodiment, moreover, inasmuch as the first ledge 92 of the central door base 82 pushes the thin-walled portion 98 of the third sewn region 88 toward the central door skin member 86, the extent to which each unit stitch 109 sinks into the sewing hole 112 can be further reduced. The seam of the third sewn region 88 is thus made easier to visually recognize.

The thick-walled portion 96 is disposed on the main base 90, which is a flat portion, of the central door base 82, whereas the thin-walled portion 98 is disposed on the first ledge 92. Therefore, a reduction in the rigidity of the central door pad 84 due to the thinning thereof can be efficiently minimized.

Furthermore, as the thin-walled portion 98 (central door pad 84) is made of polypropylene foam, the reaction force that attempts to restore the thin-walled portion 98 to its original shape when being deformed can be made comparatively small. Accordingly, the reaction force applied from the central door pad 84 to the third sewing thread 102 can be further reduced.

(First Modification)

A door lining 10*a* as an interior member according to a first modification will be described below with reference to FIG. 8. Those parts of the modification which have identical or similar functions and advantages to those of the above embodiment are denoted by identical reference characters, and will not be described in detail below. This also applies to a second modification and a fourth modification to be described later.

Figure 8:
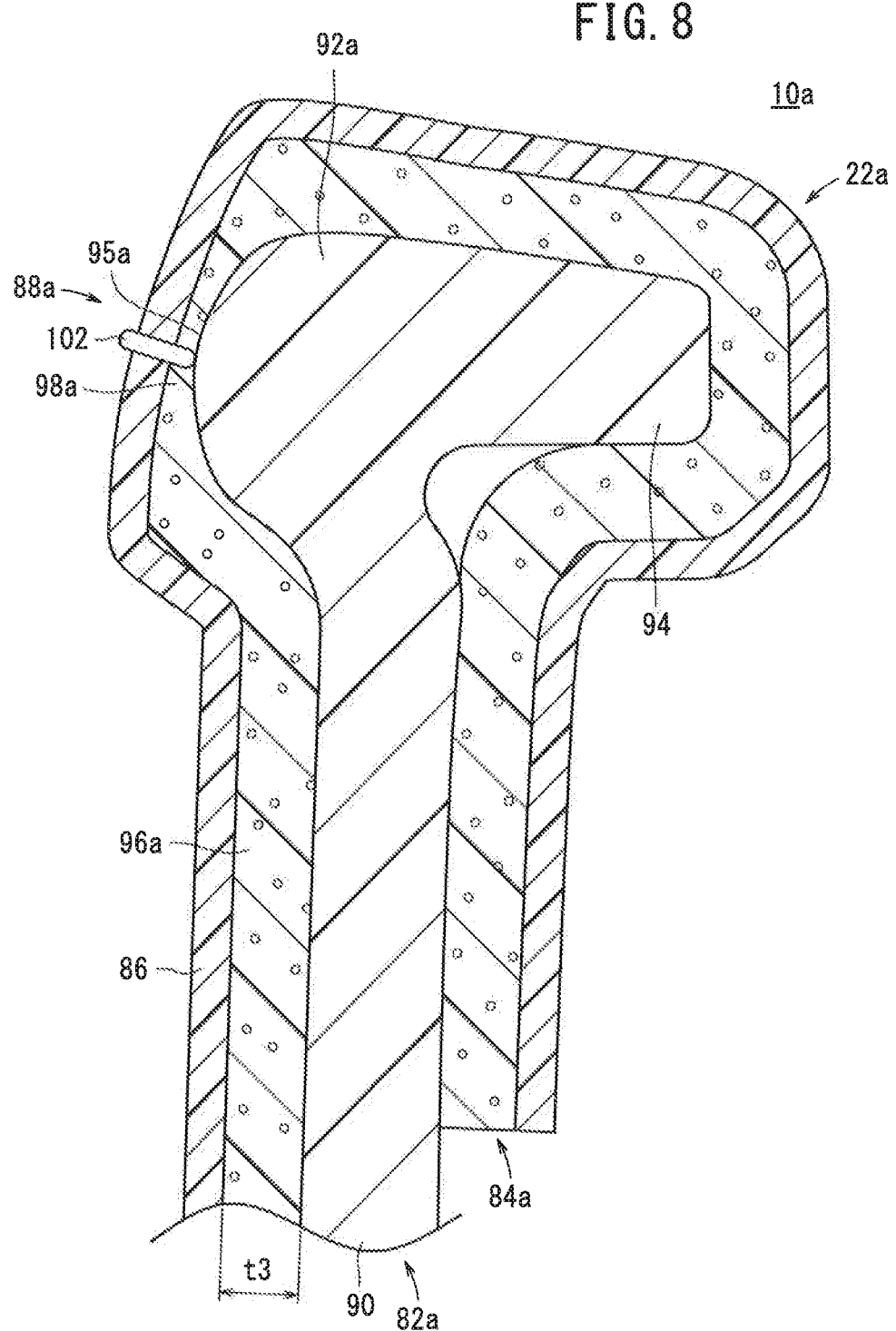
FIG. 8 is a fragmentary cross-sectional view of a central door section of a door lining as an interior member according to a first modification.

As shown in FIG. 8, in the door lining 10*a* according to the present modification, a central door section 22*a* is different in structure from that of the door lining 10. Specifically, the central door section 22*a* has a central door base 82*a* and a central door pad 84*a*.

The central door base 82*a* includes a first ledge 92*a* contiguous to the main base 90 and projecting toward one side. The first ledge 92*a* has a distal end surface 95*a* held in contact with the third sewing thread 102 and having an arc-like cross-sectional shape. The curvature of the arc of the distal end surface 95*a* may be set to any value, and the greater the curvature, the easier it is for the distal end surface 95*a* to push the third sewing thread 102 toward one side.

According to the present modification, as can be seen from FIG. 8, the third sewing thread 102 is positioned on (held in contact with) the crest of the arc of the distal end surface 95*a* of the first ledge 92*a*. In this case, the third sewing thread 102 can be more efficiently pushed toward one side.

The central door pad 84*a* includes a thin-walled portion 98*a* that is of a shape complementary to the shape of the distal end surface 95*a* of the first ledge 92*a*. In other words, the thin-walled portion 98*a* is progressively thinner along a widthwise direction thereof (a direction perpendicular to the direction in which a third sewn region 88*a* extends). A reduction in the rigidity of the thin-walled portion 98*a* can be thus efficiently minimized.

(Second Modification)

Figure 9:
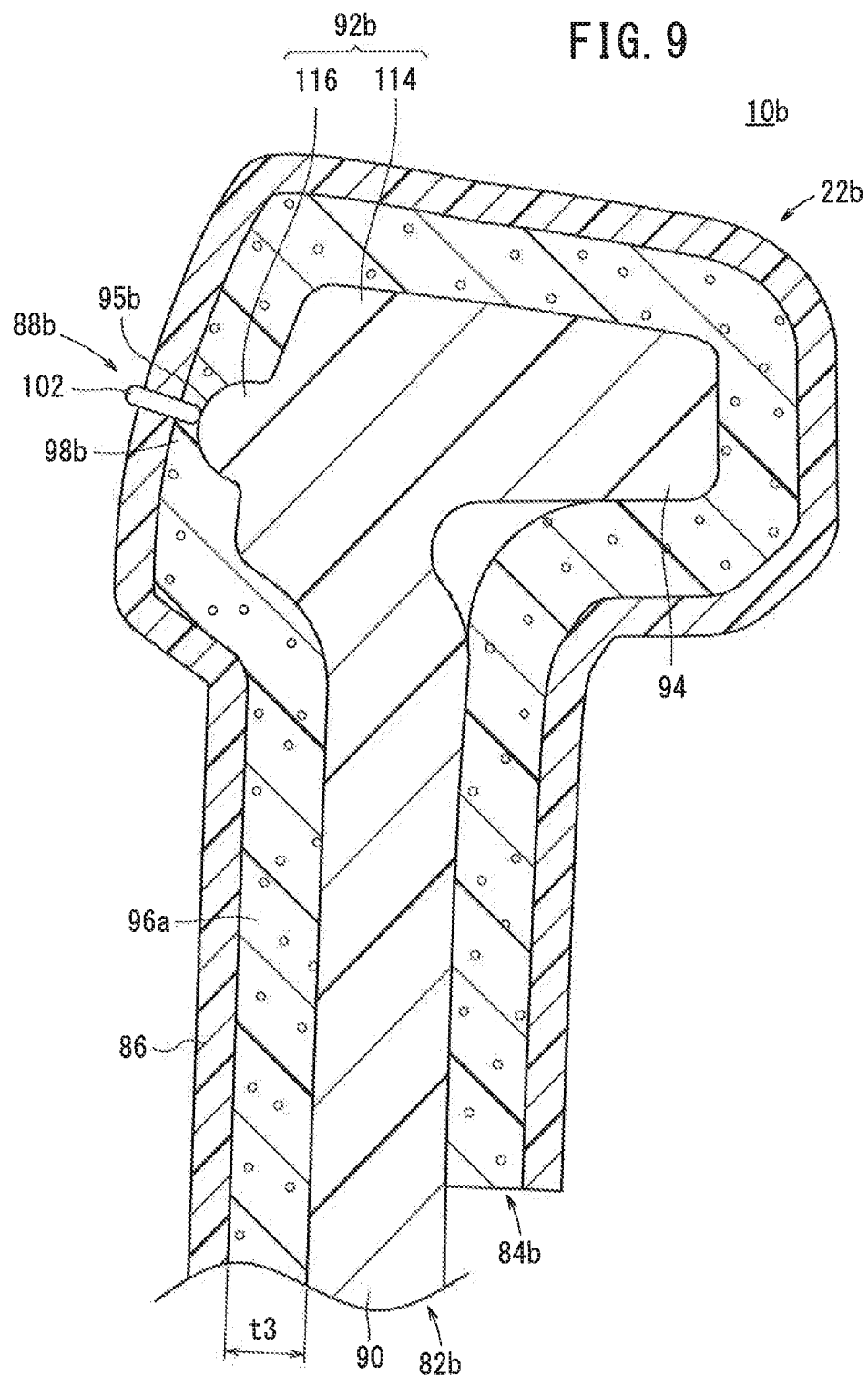
FIG. 9 is a fragmentary cross-sectional view of a central door section of a door lining as an interior member according to a second modification.

A door lining 10*b* as an interior member according to a second modification will be described below with reference to FIG. 9.

The door lining 10*b* according to the present modification is different from the door lining 10 as to the structure of a central door section 22*b*. Specifically, the central door section 22*b* has a central door base 82*b* and a central door pad 84*b*.

The central door base 82*b* includes a first ledge 92*b* that has a base land 114 which is essentially similar in shape to the first ledge 92 described above and a ridge 116 disposed on a flat surface of the distal end of the base land 114. The ridge 116 has a distal end surface 95*b* that is of an arc-like cross-sectional shape. A third sewn region 88*b* includes the third sewing thread 102 positioned on (held in contact with) the crest of the arc of the ridge 116.

The central door pad 84*b* has a thick-walled portion 96*a* disposed in covering relation to the distal end surface of the base land 114, and a thin-walled portion 98*b* that is of a shape complementary to the shape of the ridge 116.

The door lining 10*b* according to the present modification offers the same advantages as the door lining 10*a* according to the first modification described above. Even if the base land 114 needs to have a certain width for the reason of the structure of the central door section 22*b*, since the ridge 116 can push the thin-walled portion 98*b* of the third sewn region 88*b* toward the central door skin member 86, the width of the thin-walled portion 98*b* can be smaller than the width of the base land 114. Owing thereto, the proportion of the thin-walled portion 98*b* in the central door pad 84*b* is prevented from being excessively large. Thus, a reduction in the rigidity of the central door pad 84*b* can be efficiently minimized.

(Third Modification)

Figure 10:
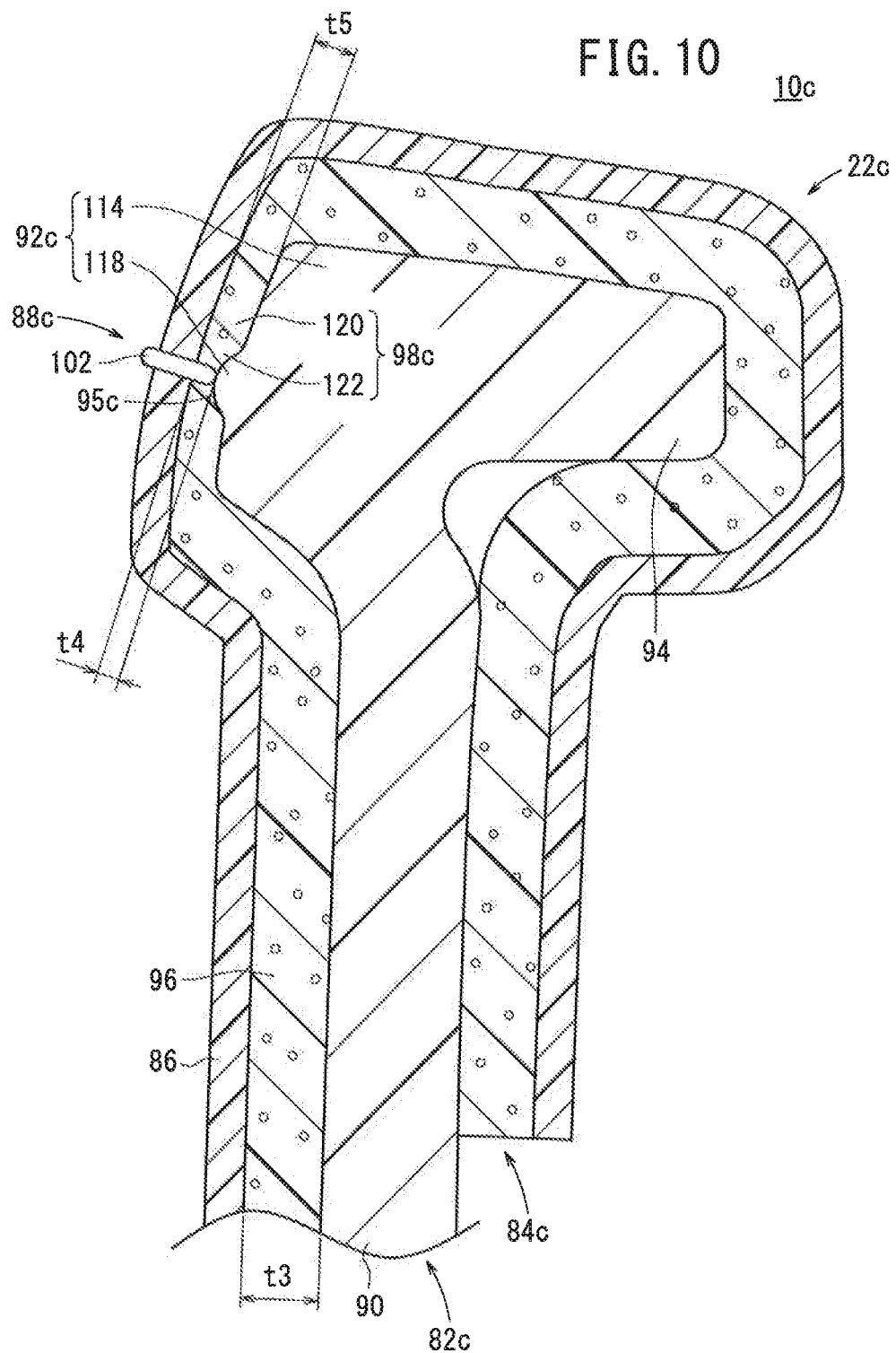
FIG. 10 is a fragmentary cross-sectional view of a central door section of a door lining as an interior member according to a third modification.

A door lining 10*c* according to a third modification will be described below with reference to FIG. 10. Those parts of the modification which have identical or similar functions and advantages to those of the second modification are denoted by identical reference characters, and will not be described in detail below.

The door lining 10*c* according to the present modification is different from the door lining 10*b* according to the second modification as to the structure of a central door section 22*c*. Specifically, the central door section 22*c* has a central door base 82*c* and a central door pad 84*c*.

The central door base 82*c* includes a first ledge 92*c* that has a ridge 118 instead of the ridge 116. The ridge 118 is similar in shape to the ridge 116, but the projecting amount of the ridge 118 is smaller than that of the ridge 116. A third sewn region 88*c* includes the third sewing thread 102 positioned on (held in contact with) the crest of the arc of a distal end surface 95*c* of the ridge 118.

The central door pad 84*c* includes a thin-walled portion 98*c* that has a first area 120 disposed on the distal end surface of the base land 114 and a second area 122 that is of a shape complementary to the shape of the ridge 118 and is disposed on the ridge 118. The first area 120 has a thickness t5 smaller than the thickness t3 of the thick-walled portion 96 and greater than the thickness t4 of a thinnest portion of the second area 122.

According to the present modification, since the thickness t5 of the first area 120 of the thin-walled portion 98*c* is smaller than the thickness t3 of the thick-walled portion 96 and greater than the thickness t4 of the thinnest portion of the second area 122, the thickness of the thin-walled portion 98*c* is reduced stepwise. Therefore, a reduction in the rigidity of the thin-walled portion 98*c* can be efficiently minimized.

(Fourth Modification)

Figure 11:
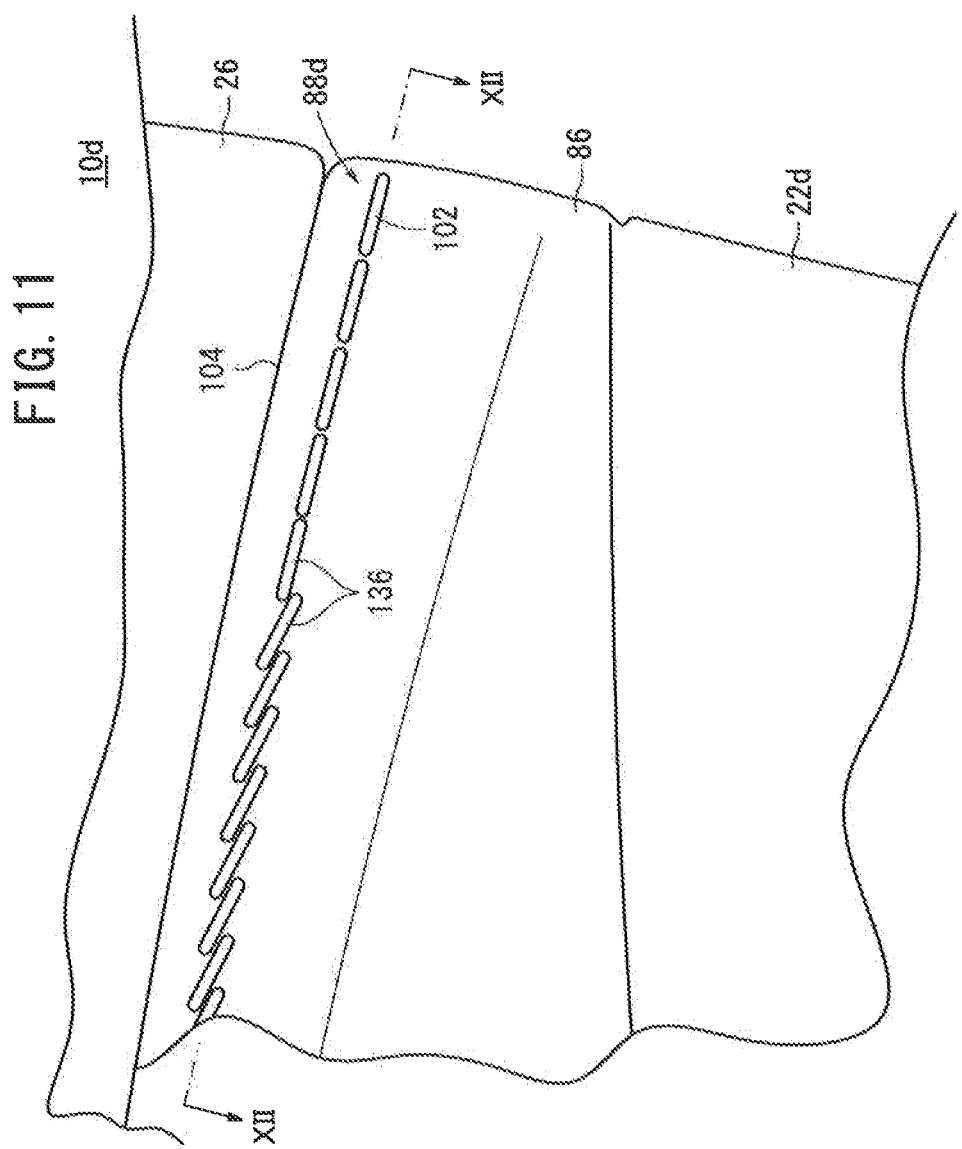
FIG. 11 is an explanatory diagram showing a seam of a third sewn region on a central door section of a door lining as an interior member according to a fourth modification.
Figure 12:
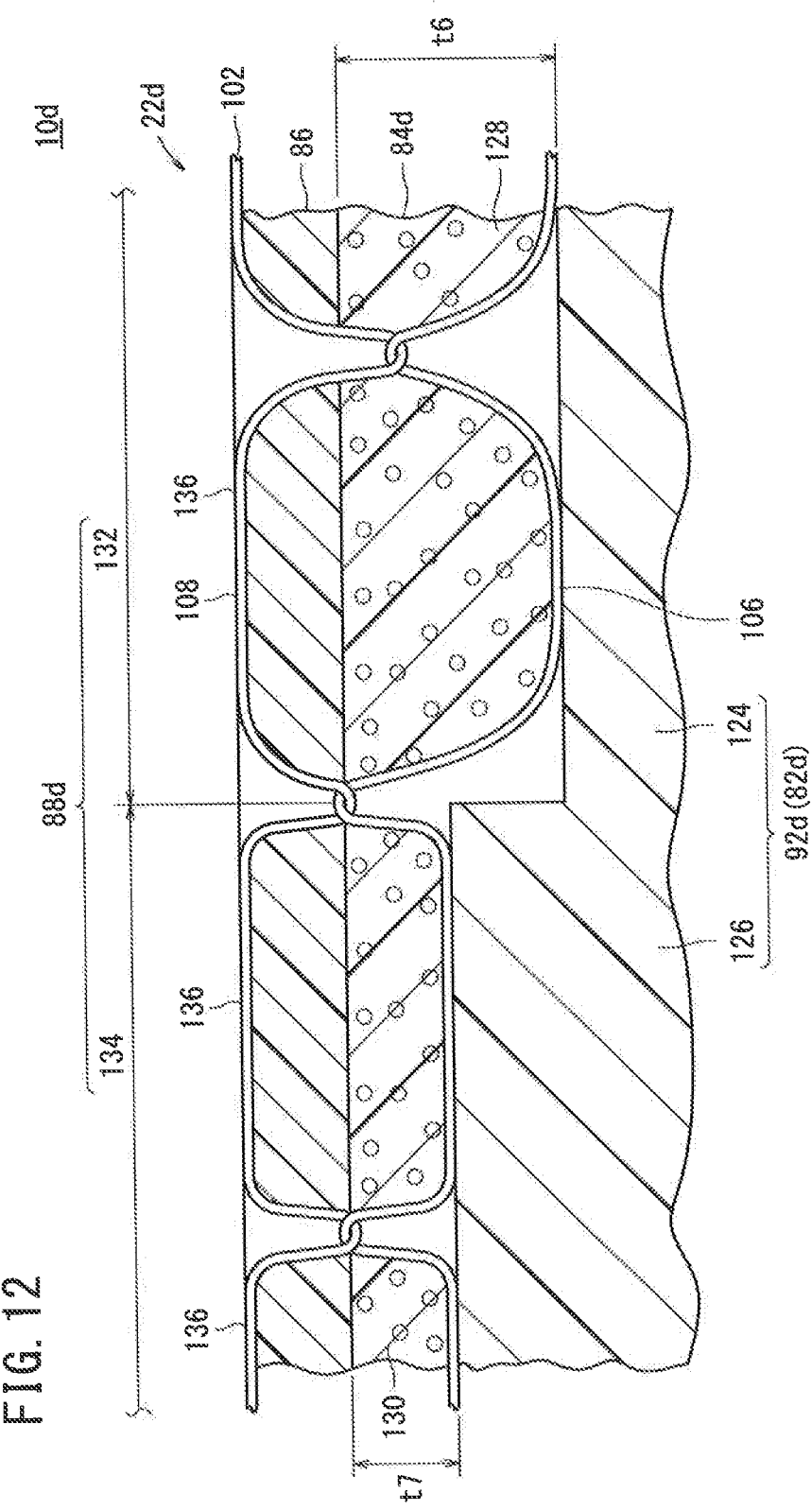
FIG. 12 is a cross-sectional view taken along line XII-XII of FIG. 11.

A door lining 10*d* as an interior member according to a fourth modification will be described below with reference to FIGS. 11 and 12. As shown in FIGS. 11 and 12, the door lining 10*d* according to the present modification is different from the door lining 10 as to the structure of a central door section 22*d*.

Specifically, the central door section 22*d* has a central door base 82*d* and a central door pad 84*d*. The central door base 82*d* includes a first ledge 92*d* having a shorter ledge 124 that projects by a smaller distance and a longer ledge 126 that projects by a greater distance, the shorter ledge 124 and the longer ledge 126 being integrally formed with each other. The shorter ledge 124 and the longer ledge 126 extend along the direction in which a third sewn region 88*d* extends.

The central door pad 84*d* has a thick-walled portion 128 disposed on the distal end surface of the shorter ledge 124 and a thin-walled portion 130 disposed on the distal end surface of the longer ledge 126. The thick-walled portion 128 has a thickness t6 that is the same as the thickness t3 of the thick-walled portion 96 described above. The thin-walled portion 130 has a thickness t7 that is the same as the thickness t4 of the thin-walled portion 98 described above.

The third sewn region 88d includes a thick-walled sewn region 132 that is produced by sewing the thick-walled portion 128 and the central door skin member 86 to each other with the third sewing thread 102, and a thin-walled sewn region 134 that is produced by sewing the thin-walled portion 130 and the central door skin member 86 to each other with the third sewing thread 102. Each of the thick-walled sewn region 132 and the thin-walled sewn region 134 is produced by the same sewing process as the third sewn region 88.

The central door section 22d thus constructed has straight stitches in the thick-walled sewn region 132 where the direction along which each unit stitch 136 extends and the direction along which the third sewn region 88d extends are aligned with each other, and slanted stitches in the thin-walled sewn region 134 where the direction along which each unit stitch 136 extends is oblique to the direction along which the third sewn region 88d extends. Therefore, the seam of the third sewn region 88d contains variations.

(Fifth Modification)

A door lining 10e as an interior member according to a fifth modification will be described below with reference to FIGS. 13 and 14. Those parts of the modification which have identical or similar functions and advantages to those of the fourth modification described above are denoted by identical reference characters, and will not be described in detail below. This also applies to a sixth modification to be described later.

Figure 13:
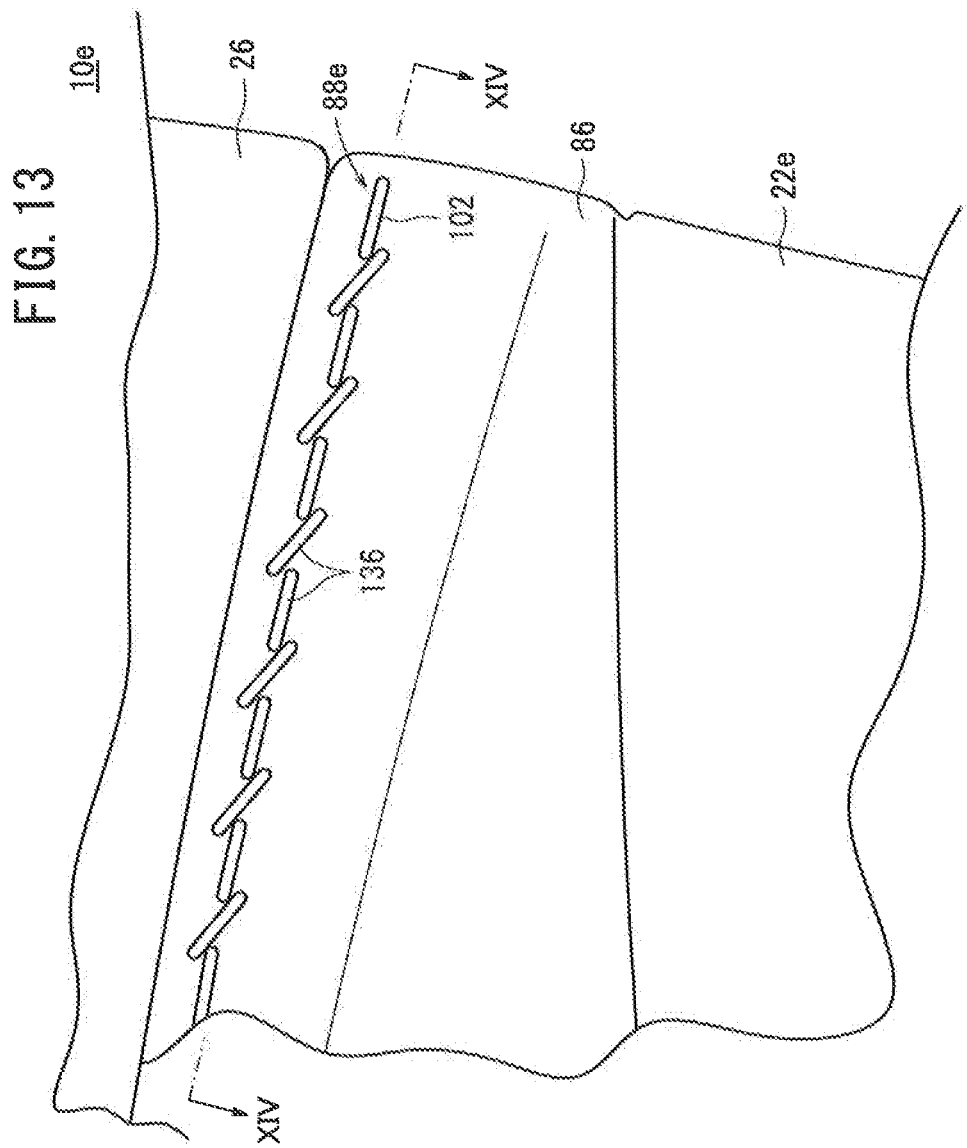
FIG. 13 is an explanatory diagram showing a seam of a third sewn region on a central door section of a door lining as an interior member according to a fifth modification.
Figure 14:
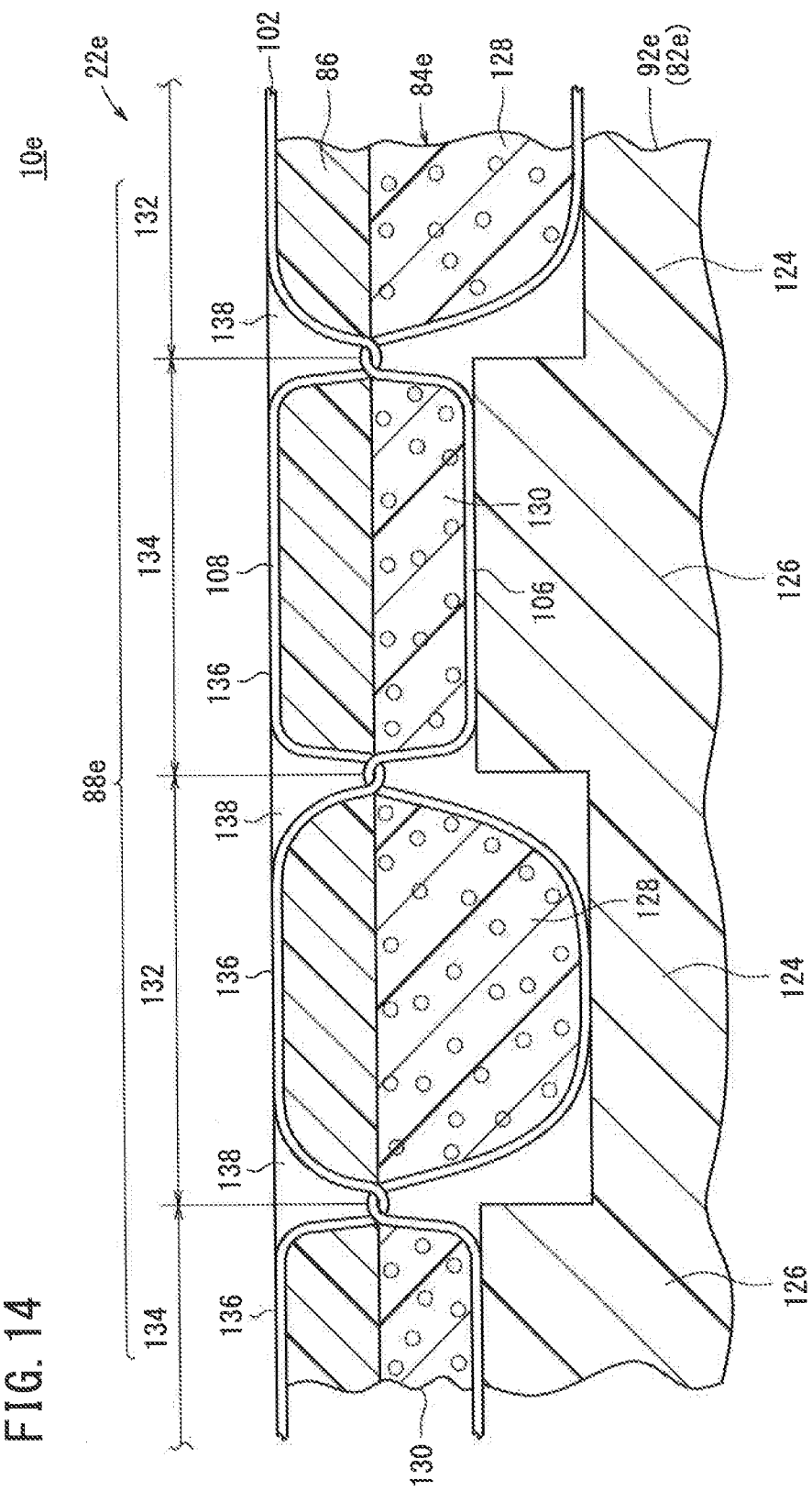
FIG. 14 is a cross-sectional view taken along line XIV-XIV of FIG. 13.

As shown in FIGS. 13 and 14, the door lining 10e according to the present modification is different from the door lining 10d as to the structure of a central door section 22e. Specifically, the central door section 22e has a central door base 82e and a central door pad 84e.

The central door base 82e has a first ledge 92e comprising a plurality of shorter ledges 124 and longer ledges 126 that are alternately disposed along the direction in which a third sewn region 88e extends. According to the present embodiment, the lengths of the shorter ledges 124 (the dimensions along the direction in which the third sewn region 88e extends) and the lengths of the longer ledges 126 are substantially the same as each other.

The central door pad 84e has thick-walled portions 128 disposed on the distal end surfaces of the respective shorter ledges 124 and thin-walled portions 130 disposed on the distal end surfaces of the respective longer ledges 126. The third sewn region 88e is produced by sewing the central door pad 84e and the central door skin member 86 to each other with the third sewing thread 102 such that sewing holes 138 are positioned at the respective boundaries between the thick-walled portions 128 and the thin-walled portions 130. In other words, the third sewn region 88e is formed by alternately arranging thick-walled sewn regions 132 and thin-walled sewn regions 134.

In the central door section 22e thus constructed, straight stitches and slanted stitches can be arranged alternately (see FIG. 13). As the proportion of the thin-walled portion 130 in the central door pad 84e can be lowered compared with the thin-walled portion in the central door pad 84, a reduction in the rigidity of the central door pad 84e can be more efficiently minimized.

(Sixth Modification)

A door lining 10f as an interior member according to a sixth modification will be described below with reference to FIG. 15.

Figure 15:
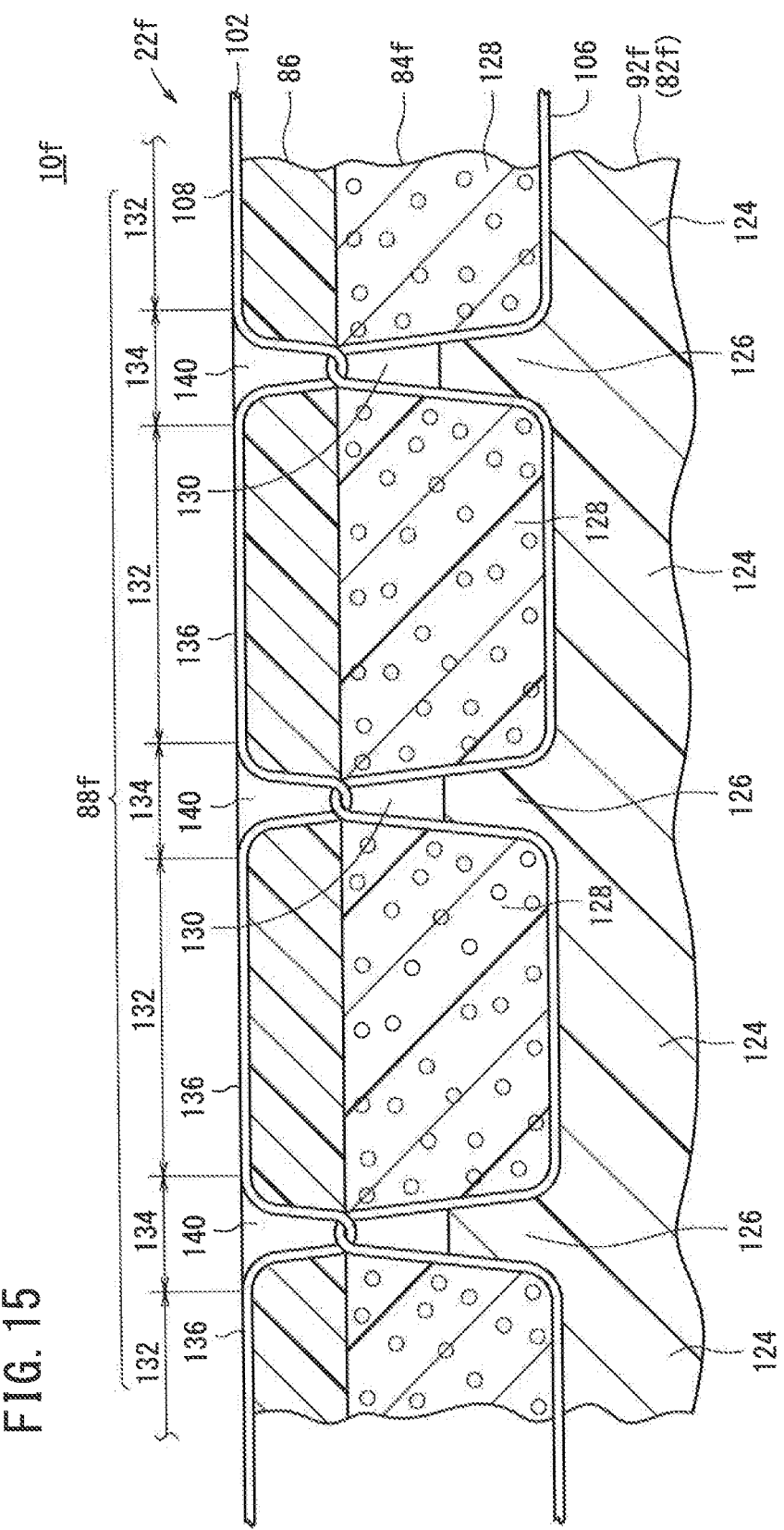
FIG. 15 is a fragmentary cross-sectional view of a central door section of a door lining as an interior member according to a sixth modification.

As shown in FIG. 15, the door lining 10f according to the present modification is different from the door lining 10d as to the structure of a central door section 22f. Specifically, the central door section 22f has a central door base 82f and a central door pad 84f.

The central door base 82f has a first ledge 92f comprising a plurality of shorter ledges 124 and longer ledges 126 that are alternately disposed along the direction in which a third sewn region 88f extends. The lengths of the shorter ledges 124 (the dimensions along the direction in which the third sewn region 88f extends) are greater than the lengths of the longer ledges 126.

The central door pad 84f has thick-walled portions 128 disposed on the distal end surfaces of the respective shorter ledges 124 and thin-walled portions 130 disposed on the distal end surfaces of the respective longer ledges 126. The third sewn region 88f is produced by sewing the central door pad 84f and the central door skin member 86 to each other with the third sewing thread 102 such that sewing holes 140 are positioned at the thin-walled portions 130. In other words, the third sewn region 88f is formed by alternately arranging thick-walled sewn regions 132 and thin-walled sewn regions 134.

In the central door section 22f thus constructed, the seam of the third sewn region 88f can be formed of an array of slanted stitches (see FIG. 5). As the proportion of the thin-walled portion 130 in the central door pad 84f can be lowered compared with the thin-walled portion in the central door pad 84, a reduction in the rigidity of the central door pad 84f can be further minimized.

The present invention is not limited to the above embodiments, but may employ various arrangements without departing from the scope of the invention.

For example, the interior member according to the present invention may be used on apparatus other than vehicles.

The invention claimed is:

1. An interior member comprising:
    a pad including a thin-walled portion and a thick-walled portion, the pad being elastically deformable;
    a skin member that covers the pad;
    a sewn region produced by sewing the pad and the skin member to each other with a sewing thread; and
    a base that supports the pad thereon,
    wherein:
    the sewn region is disposed on the thin-walled portion of the pad,
    the thin-walled portion is made thinner than the thick-walled portion so as to reduce a reaction force applied from the pad to the sewing thread, and
    the base integrally includes a ledge configured to push a portion of the sewn region, that is positioned on a side of the pad, toward the skin member of the sewn region.

2. The interior member according to claim 1, wherein the thin-walled portion is formed by bending.

3. The interior member according to claim 1, wherein the ledge has a corner; and
    the sewing thread is held in contact with a portion of the ledge that is different from the corner.

4. The interior member according to claim 1, wherein the ledge is of an arc-like cross-sectional shape.

5. The interior member according to claim 1, wherein the base further includes a flat portion contiguous to the ledge; and
    the thick-walled portion is disposed on the flat portion, and the thin-walled portion is disposed on the ledge.

6. The interior member according to claim 1, wherein an area of the thin-walled portion that corresponds to the sewn region is thinner than an area of the thin-walled portion that does not correspond to the sewn region.

7. The interior member according to claim 1, wherein the sewn region includes:
   a thin-walled sewn region produced by sewing the skin member and the thin-walled portion to each other with the sewing thread; and
   a thick-walled sewn region produced by sewing the skin member and the thick-walled portion to each other with the sewing thread, the thin-walled sewn region and the thick-walled sewn region being integral with each other.

8. The interior member according to claim 1, wherein the thin-walled portion is wider than a diameter of the sewing thread.

9. The interior member according to claim 1, wherein the interior member is mounted on a vehicle.

10. The interior member according to claim 1, wherein the thin-walled portion is made of polypropylene foam.

11. The interior member according to claim 4, wherein the sewing thread is positioned on a crest of the ledge.

\* \* \* \* \*